(12) United States Patent
Yum et al.

(10) Patent No.: US 9,352,862 B2
(45) Date of Patent: May 31, 2016

(54) APPARATUS AND METHOD OF MANUFACTURING COMPLETELY COOKED RICE WHICH IS COMPLETELY COOKED IN STERILIZED CONDITION

(75) Inventors: Kwang Suk Yum, Pyeongtaek-si (KR); Jae Soo Youm, Bucheon-si (KR); Jae Ung Yoo, Bucheon-si (KR)

(73) Assignee: Kwang Suk Yum (KR)

( * ) Notice: Subject to any disclaimer, the term of this patent is extended or adjusted under 35 U.S.C. 154(b) by 216 days.

(21) Appl. No.: 13/807,774

(22) PCT Filed: Jun. 30, 2011

(86) PCT No.: PCT/KR2011/004807
§ 371 (c)(1),
(2), (4) Date: Feb. 19, 2013

(87) PCT Pub. No.: WO2012/002752
PCT Pub. Date: Jan. 5, 2012

(65) Prior Publication Data
US 2013/0156909 A1    Jun. 20, 2013

(30) Foreign Application Priority Data

Jul. 2, 2010    (KR) .................... 10-2010-0064083

(51) Int. Cl.
| | | |
|---|---|---|
| B65B 25/00 | (2006.01) | |
| A23L 1/182 | (2006.01) | |
| A23L 1/01 | (2006.01) | |
| A23L 1/10 | (2006.01) | |

(52) U.S. Cl.
CPC ............. *B65B 25/001* (2013.01); *A23L 1/0121* (2013.01); *A23L 1/182* (2013.01); *A23L 1/1826* (2013.01); *A23L 1/10* (2013.01)

(58) Field of Classification Search
CPC ..... A23L 1/182; A23L 1/1826; A23L 1/0121; A23L 1/10

USPC .................. 426/396, 392, 397; 99/361, 367
See application file for complete search history.

(56) References Cited

U.S. PATENT DOCUMENTS 5,860,356 A * 1/1999 Kageyama .................... 99/330

FOREIGN PATENT DOCUMENTS

| GB | 2449726 A | * 12/2008 |
|---|---|---|
| JP | 08332037 | 12/1996 |
| JP | 2003033146 | 2/2003 |
| JP | 2010119327 | 6/2010 |
| KR | 1020040053945 | 6/2004 |
| KR | 100903488 | 6/2009 |
| KR | 101184638 | 9/2012 |

OTHER PUBLICATIONS

International Search Report—PCT/KR2011/004807 dated Mar. 26, 2012.

* cited by examiner

*Primary Examiner* — Jyoti Chawla
(74) *Attorney, Agent, or Firm* — Cantor Colburn LLP

(57) ABSTRACT

A method of manufacturing packaged completely cooked rice or a packaged completely cooked mixed rice comprises a steaming process of sterilizing and primarily cooking the contents in the opened container by filling the controlled steam having high pressure and high temperature in the steaming unit; a cooking process of additionally sterilizing the contents in the opened container by filling the controlled steam having high pressure and high temperature in the steaming unit, and supplying water in the contents, and then completely cooking the contents; and a sealing process of supplying clean nitrogen gas to the completely cooked contents in the sealing unit and sealing the upper end of the opened container with the lid film, wherein the steaming unit, cooking unit and the sealing unit are connected in turn in the one container so that the opened container can be input into and output from each of the units.

2 Claims, 3 Drawing Sheets

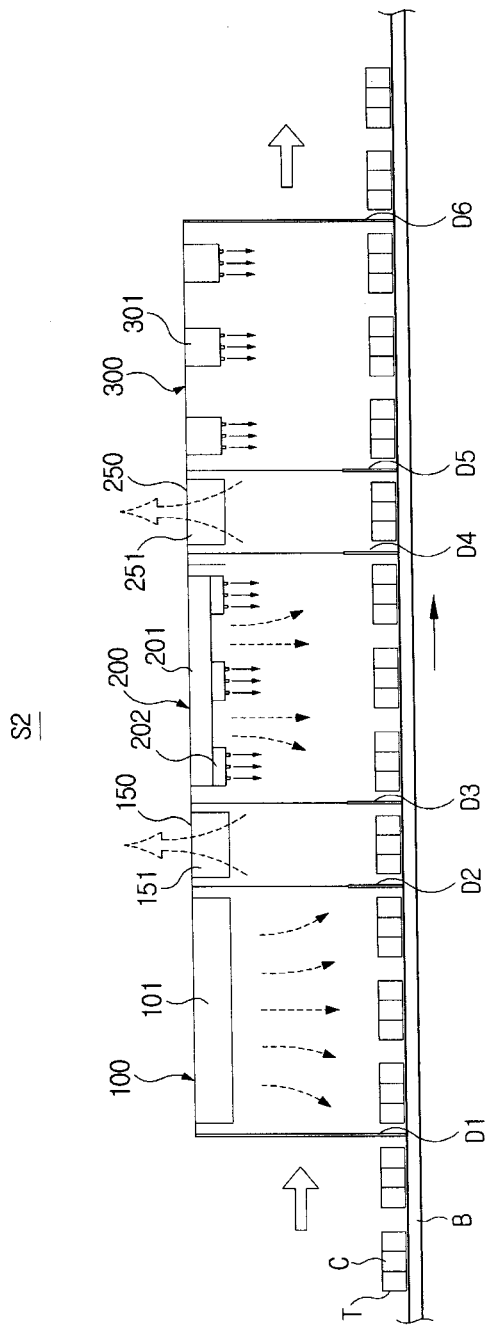

APPARATUS AND METHOD OF MANUFACTURING COMPLETELY COOKED RICE WHICH IS COMPLETELY COOKED IN STERILIZED CONDITION

TECHNICAL FIELD

The present invention relates to manufacturing of sterilized packed rice, and more particularly, to an apparatus and method of manufacturing completely cooked rice, in which contents selectively combined from various cereal crops including rice, nuts and other additives are provided in a completely cooked state so that a user can eat instantly without a separate heating process.

BACKGROUND ART

In the sterilized packed rice, rice is main ingredient and may be mixed with additives such as glutinous rice or other grains and nuts. Moreover, in a pretreatment process for manufacturing the sterilized packed rice which can be preserved for a long time, there has been used a method of sterilizing the ingredient, in which it is feared that a microscopic organism will grow and multiply, by treating with an organic acid or dipping therein for a long time at a high temperature.

Generally, the sterilized packed rice is manufactured by filling food in a container, sealing it and then sterilizing it at high pressure and high temperature of about 130° C., thereby perfectly eliminating thermo-resistant bacteria as well as general bacteria.

However, in a packed food, since heat is slowly transferred from an edge portion thereof to a center portion thereof, the edge portion thereof is excessively heated when the center portion reaches the temperature of 130° C. and thus the taste of food is considerably deteriorated. On the contrary, in case that the packed food is sterilized at the high pressure and high temperature without the deterioration of food taste, the center portion thereof is not reached the desired temperature, and thus it is impossible to achieve the aseptic condition.

To solve the problem, there has been proposed, for example, a method of preparing packaged cooked rice and a method of sterilizing food in Korean Patent No. 265482 filed and granted to Shinwa kikai co., Ltd (FIG. 1).

In the method of preparing packaged cooked rice disclosed in Korean Patent No. 265482, rice which is washed and dipped in water so as to have a water content of 10~30% is filled by a required amount in an opening tray and then transferred to a closed chamber so that the rice and container can be sterilized at the high pressure and high temperature/

The sterilizing process in the closed chamber is carried out in a short time of a few tens of seconds by using saturated steam with the high pressure of 2.7~3.0 kgf/cm² and high temperature of 100° C. or more, preferably 130~140° C. Herein, the saturated steam with the high pressure and high temperature is intermittently flashed on the rice filled in the opening tray. In such intermittently and snatchily flashing process, for example, the flashing of the saturated steam with the high pressure and high temperature is repeatedly performed six to eight times in one cycle for 5 to 10 seconds.

In this case, an opening portion of the opening tray is coated with a plate member having honeycomb-shaped holes in the closed chamber in order to prevent the rice filled in each tray from being scattered by the intermittently flashing of the saturated steam.

After the sterilizing process in the closed chamber, water for cooking the rice is filled by a predetermined amount in each tray and the rice in the tray is put into a steam rice cooker and cooked by a typical method using the steam. Then the tray is transferred to a sealing unit by a transferring conveyor. In the process, the opening tray is passed through a tunnel booth in which a clean air generating device, such that bacteria is discharged by the clean air. When the tray is arrived at the sealing unit, inert gas is flashed on each tray, and a lid member is applied thereto and then sealed. The rice in the sealed tray is settled in its own steam for a desired period of time by a typical method and then cooled to the room temperature while the sealed tray is passed through a cooling-water bath. After the cooling process, the tray is dried and passed through a post-treatment process such as printing of pack date and expiration date, pinhole testing, weighing or the like, and packed with a desired case and then shipped.

The method of preparing the packaged cooked rice, disclosed in Korean Patent No. 265482 includes sterilizing, cooking and sealing processes. Particularly, in the closed chamber, the sterilizing process is performed repeatedly so that the saturated steam having the high pressure of 2.7~3.0 kgf/cm² and high temperature of 130~140° C. is intermittently flashed six to eight times in one cycle for 5 to 10 seconds. In case of the shock manner that the saturated steam having the high pressure and high temperature is intermittently and snatchily flashed on the rice filled in the opening tray, it is apprehended that the rice is scattered. In order to prevent the scattering of the rice, the opening portion of the opening tray is coated with the plate member having honeycomb-shaped holes. Thus there is a problem that the structure thereof is complicated.

In the above-mentioned method, there is some doubt whether the thermo-resistant bacteria will be completely eliminated by the shock manner that the saturated steam having the high pressure and high temperature is intermittently and repeatedly flashed in a short time of a few tens of seconds, and also it is feared that external air may be introduced due to its own sealing manner that is partially opened. Moreover, there are some other problems that the separate clean room equipment, using of a food preservative and a heat sterilization process are needed additionally in order to maintain the sterilized condition and prevent bacterial penetration due to the introduction of the external air.

Further, in the above-mentioned method, since the finally prepared rice is provided in the semi-processed state, it is inconvenient that a user has to separately heat the packaged cooked rice to eat.

DISCLOSURE

Technical Problem

An object of the present invention is to provide an apparatus and method of manufacturing completely cooked rice, in which contents selectively combined from various cereal crops including rice, nuts and other additives (including powders of the cereal crops, the nuts or the like) are provided in a completely cooked state so that a user can eat instantly without a separate heating process.

Another object of the present invention is to provide an apparatus and method of manufacturing completely cooked rice, in which a sterilized condition by saturated steam having high pressure and high temperature is kept over the entire processes for manufacturing the completely cooked rice using the contents selectively combined from various cereal crops including rice, nuts and other additives, and thus it is possible to preserve the packaged completely cooked rice for a long time without a separate preservation adding by means of the system sterilization manner in which completely eliminate even the thermo-resistant bacteria having the endogenous spores as well as general virus.

Technical Solution

To achieve the object of the present invention, the present invention can provide an apparatus for manufacturing completely cooked rice or completely cooked mixed rice, in which the contents selectively combined from various cereal crops including rice, nuts and other additives including powders of the cereal crops, the nuts or the like are provided in a completely cooked state so that a user can eat instantly without a separate heating process, comprising a steaming unit which is filled with controlled steam having high pressure and high temperature in order to sterilize and primarily cook contents in an opened container; a cooking unit which is filled with the controlled steam having high pressure and high temperature in order to additionally sterilize the contents in an opened container and in which water is supplied to the contents and the contents is completely cooked; and a sealing unit in which clean nitrogen gas is supplied to the completely cooked contents and an upper end of the container is sealed with a lid film, wherein the steaming unit, cooking unit and the sealing unit are connected in turn in the one chamber so that the opened container can be input into and output from each of the units.

Preferably, the cooking unit further comprises a water shower system in which multiple nozzles are arranged in order to supply a desired amount of water necessary for the primarily cooked contents in the opened container, and the nozzles are arranged so as to be corresponding to a size and arranged type of each opened container and operated in a piston manner so that a precise amount of water is uniformly sprayed on the cooked contents, and a diameter of each nozzle is about 0.5~5 mm. Preferably, the nozzle is operated in a piston manner so that a precise amount of water is uniformly sprayed on the cooked contents.

Preferably, the cooking unit may further include an extra insert system which can supply a solid matter or the solid matter mixed with a liquid matter to the contents including various spices, seafood and edible ingredients in the opened container transferred from the previous steaming unit. Preferably, the extra insert system has an up/down moving structure which can inject a solid matter or the solid matter mixed with a liquid matter.

Further, the present invention provides a method of manufacturing packaged completely cooked rice or cooked mixed rice, in which the contents selectively combined from various cereal crops including rice, nuts and other additives including powders of the cereal crops, the nuts or the like are provided in a completely cooked state so that a user can eat instantly without a separate heating process, comprising a steaming process of sterilizing and primarily cooking the contents in the opened container by filling the controlled steam having high pressure and high temperature in the steaming unit; a cooking process of additionally sterilizing the contents in the opened container by filling the controlled steam having high pressure and high temperature in the steaming unit, and supplying water in the contents, and then completely cooking the contents; and a sealing process of supplying clean nitrogen gas to the completely cooked contents in the sealing unit and sealing the upper end of the opened container with the lid film, wherein the each process is performed by the steaming unit, cooking unit and the sealing unit in turn which are provided in the one chamber during the opened container can be input into and output from each of the units.

Preferably, in the steaming process, an inner pressure of the steaming unit by the steam is kept in 1.2~3.0 $kgf/cm^2$, and a process time is carried out for 2~5 minutes. In the cooking process, an inner pressure of the cooking unit by the steam is kept in 0.5~2.0 $kgf/cm^2$, and the process time is carried out for 15~40 minutes. And in the sealing process, an inner pressure of the sealing unit by the steam is kept in 0.1~1 $kgf/cm^2$ so that external air is prevented from being contacted with the sterilized and completely cooking contents.

Preferably, the cooking process further comprises an extra insert process step of supplying a mixture selectively combined from various spices, seafood and edible ingredients to the contents in the opened container.

Advantageous Effects

As described above, since the high pressure and high temperature steam supplied to each of the steaming unit, cooking unit and sealing unit is controlled so that the pressure and temperature is differently supplied at each unit, the contents selectively combined from various cereal crops including rice, nuts and various additives including powders of the cereal crops, the nuts or the like are provided in the completely cooked state so that a user can eat instantly without a separate heating process.

Further, according to the present invention, since the system sterilization manner in which the sterilization condition is maintained over the entire processes including the steaming unit, cooking unit and sealing unit by using the saturated steam having the high pressure and high temperature, it is possible to completely eliminate even the thermo-resistant bacteria contained in the contents filled in the opened container. Also the introduction of the external air is fundamentally prevented and the bacteria contained in the air are prevented from being contacted with the contents, and thus it is possible to preserve the packaged completely cooked rice for a long time without a separate preservation adding.

DESCRIPTION OF DRAWINGS

The above and other objects, features and advantages of the present invention will become apparent from the following description of preferred embodiments given in conjunction with the accompanying drawings, in which:

FIG. 3 is a flow chart of a method of manufacturing the completely cooked rice according to the present invention.

BEST MODE

Figure 1:
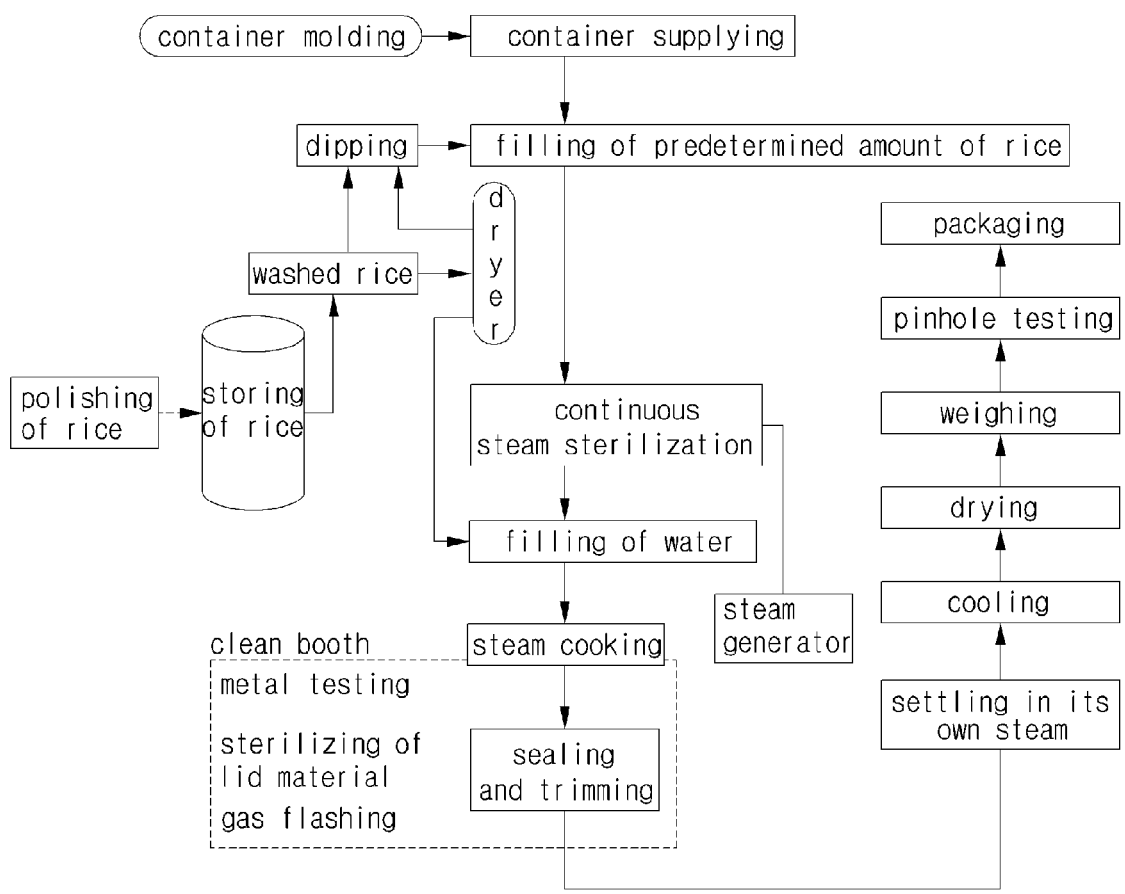
FIG. 1 is a view of a conventional method of manufacturing packaged cooked rice.
Figure 2:
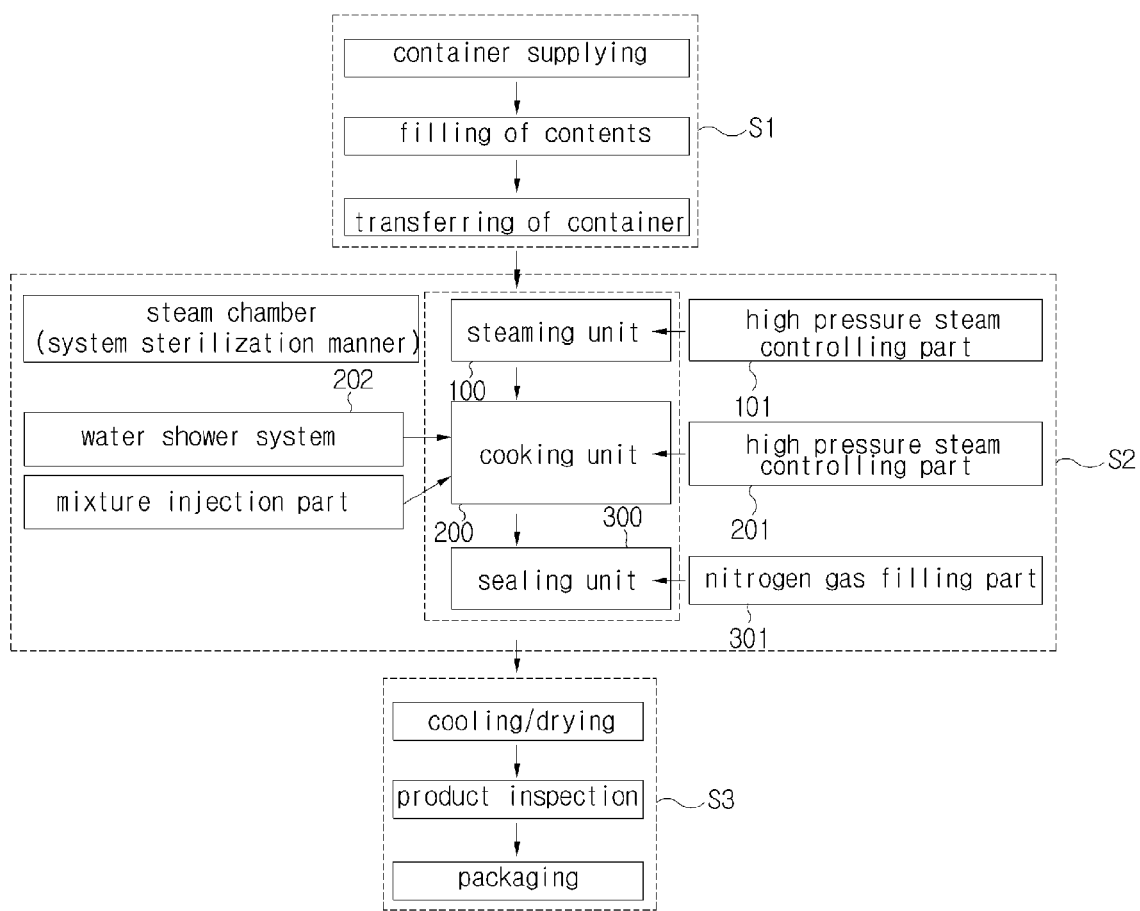
FIG. 2 is a view showing the configuration of an apparatus for manufacturing completely cooked rice according to the present invention.

Hereinafter, the embodiments of the present invention will be described in detail with reference to accompanying drawings, i.e., FIGS. 2 and 3.

A method of manufacturing packaged completely cooked rice according to the present invention includes a pretreatment process step S1 of putting washed and dipped rice or the like in each container (hereinafter, called "opened container") of which an upper portion is opened and supplying it, a preparing step S2 of cooking the rice or the like in the opened container at an atmosphere of high pressure and high temperature while the opened container is transferred and then sealing the opened container, and a post-treatment process step S3 of producing the packaged completely cooked rice by cooling, drying, packing and printing on the sealed opened container.

In the method of manufacturing the packaged completely cooked rice according to the present invention, the pretreatment process step S1 is as follows:

Cereal crops like polished rice and barley, nuts, other additives (including powders of the cereal crops, the nuts or the like) and a mixture thereof, as a main ingredient, are washed and soaked in water and then dried so as to maintain a desired water content. In case of the rice, it is preferable that the water content is less than 20%. The reason why the desired water content has to be maintained is to prevent the crops from being burned in a steaming process of the preparing step S2, rapidly cook the contents and also maximize the sterilization effect.

The cereals used in the method of manufacturing the packaged completely cooked rice according to the present invention include rice, barley, millet, oat, sorghum, adlay, corn, bean or the like. Herein, brown rice, polished rice (70-percent polished rice, 50-percent polished rice, etc.) are commonly called the rice. The nuts include chestnut, walnut, jujube, acorn, sesame, pine nut or the like of which shells are removed. The other additives include powders of the cereals and nuts as well as finely chopped meats, fishes, vegetables.

The water used in washing and soaking the cereal crops like rice and barley, nuts, other additives and the mixture thereof may be edible natural water, service water and purified water. If necessary, the water may be additionally added to the cereal crops, nuts and other additives after the soaking and drying process in order to maintain the certain water content.

After the various ingredients and the mixture thereof are filled by a predetermined amount in the sealable opened container C using a separate feeding unit, as described above, a tray T in which multiple opened containers filled with the contents are arranged is supplied to a steam chamber S2 for preparing the packaged completely cooked rice by using a tray transferring unit B such as a conveyor belt.

The steam chamber S2 is an apparatus for manufacturing the packaged completely cooked rice, in which steam having high pressure and high temperature is supplied. Multiple processing units are integratively provided in one chamber.

In detail, the steam chamber S2 includes a steaming unit 100 in which the steam having high pressure and high temperature is injected in order to primarily steam the contents in the opened container, a cooking unit 200 in which the water is supplied and an additional mixture is injected into the contents of the opened container while the steam having high pressure and high temperature is injected, and a sealing unit 300 in which clean nitrogen gas is supplied to the completely cooked contents and an upper end of the opened container is sealed with a lid film.

The units are arranged, in turn, in the steam chamber S2, and damping units 150, 250 with steam discharging and pressure controlling functions is disposed among the units.

Further, a high pressure steam controlling part 101, 201 is provided at each of the steaming unit 100 and cooking unit 200 so that the high pressure and high temperature steam generated from the steam chamber S2 is adjusted to a proper pressure.

And a steam pressure controlling part 151, 251 is disposed at each of the damping units 150 and 250. Thus, if the opened container is output from each unit 100, 200 after the steaming process of the steaming unit 100 and the cooking process of the cooking unit 200, the damping unit 150 disposed at the rear end of the steaming unit 100 is kept in the same pressure as the inside of the cooking unit 200 and the damping unit 250 disposed at the rear end of the cooking unit 200 is kept in the same pressure as the inside of the sealing unit 300 through an internal steam pressure controlling operation which additionally introduces or discharges the steam.

Referring to FIG. 3, in the steam chamber S2, the steaming unit 100, the damping unit 150, the cooking unit 200, the damping unit 250 and the sealing unit 300 are arranged in turn. An opening/closing door D1, D2, D3, D4, D5, D6 is provided among the units, i.e., at input and output parts of each unit. Preferably, the opening/closing door D1, D2, D3, D4, D5, D6 is opened and closed by being interlocked with the tray transferring unit B.

In the present invention, it is preferable that the entire processes including the pretreatment process, the preparing process and the post-treatment process are automatically carried out by using the conveyor belt type tray transferring unit B.

Next, the process of preparing the packaged completely cooked rice, which performed in the steam chamber S2, will be described.

Firstly, the steaming process in the steaming unit 100 is described.

The opened container C which is filled with the contents like the rice or the like and transferred to the steam chamber S2 by the tray transferring unit B is firstly input to the inner portion of the steaming unit 100. In the steaming unit 100, the contents in the transferred opened container C is directly contacted with the high pressure and high temperature steam and rapidly cooked primarily.

Specially, in case of mixed cereal crops, since the cooking conditions for the cereal crops may differ from each other, the high pressure and high temperature is supplied to the steaming unit 100 so that an inner pressure of the steaming unit 100 is maintained in $1.2 \, kgf/cm^2 \sim 3.0 \, kgf/cm^2$, thereby preventing the contents from being half-cooked. Herein, a process time (2~5 minutes) is maintained properly in order to prevent the contents from being partially burned or golden by excessive thermal contact.

In this process as one of the system sterilization type construction elements, a sufficient load (heat and pressure) necessary to completely eliminate endogenous spores of thermoresistant bacteria is provided. And the proper operation condition, i.e., the steam pressure (temperature) and the process time can be selectively changed considering a load which is additionally introduced for sterilization in the following cooking process.

Next, the cooking process in the cooking unit 200 is described.

In the cooking unit 200, it preferable that the high pressure and high temperature steam is supplied so that an inner pressure thereof is kept in $0.5 \, kgf/cm^2 \sim 2.0 \, kgf/cm^2$ and thus the contents are completely cooked within about 15~40 minutes while a taste thereof is maintained.

In this process as one of the system sterilization type construction elements formed in the steam chamber S2, the proper operation condition, i.e., the steam pressure (temperature) and the process time can be selectively changed considering a mixing ratio of the contents and the load which is applied for sterilization in the previous steaming process.

Meanwhile, the cooking unit 200 may include a water shower system 202 which supplies a desired amount of water in order to maintain the taste of the contents in the opened container C transferred from the previous steaming unit 100.

The water shower system 202 which uniformly supplies the water necessary for the cooked contents may be configured so that multiple nozzles are arranged at the inner upper side of the cooking unit 200. The arrangement of the nozzle is achieved to be corresponding to a size and arranged form of each container input into the cooking unit, and a diameter of each nozzle is about 0.5~5 mm. Preferably, the nozzle is operated in a piston manner so that a precise amount of water is uniformly sprayed on the cooked contents.

Further, it is preferable that the water shower system 202 is configured so that the amount of water, the temperature and the supplied number (1~3) can be adjusted according to the requirement of a final result such as cooked rice, rice cake and rice porridge. Further, if necessary, in order to control the taste of the contents, a liquid additive may be supplied on a surface of the contents.

Moreover, the cooking unit 100 may further include an extra insert system (not shown) which can supply a desired mixture to the contents in the opened container transferred from the previous steaming unit 100.

The extra insert system is to supply various spices, seafood and edible ingredients which can be added to the contents. Preferably, the extra insert system has an up/down moving structure which can inject a solid matter or the solid matter mixed with a liquid matter.

Next, the sealing process in the sealing unit 300 is described.

The contents in the container after the cooking process, which is in the completely cooked state, are input into the sealing unit 300. In the sealing unit 300, the clean nitrogen gas is supplied to the contents, and at the same time, the upper end of the container is sealed with the lid film. Herein, in the sealing unit 300, the high pressure and high temperature steam is supplied to the contents so that the sterilized contents are prevented from being contacted with the external air. Therefore, it is preferable that an inner pressure of the sealing unit 300 is kept in a positive pressure of at least 0.1~1.0 kgf/cm$^2$.

Hereinafter, the post-treatment process S3 will be described.

The container of which the sealing process is finished is passed through the cooling and drying processes and the visual and status inspections, and packaged in a proper unit. And the packaged container is also passed through the printing process and then shipped.

INDUSTRIAL APPLICABILITY

As described above, since the high pressure and high temperature steam supplied to each of the steaming unit, cooking unit and sealing unit is controlled so that the pressure and temperature is differently supplied at each unit, the contents selectively combined from various cereal crops including rice, nuts and various additives including powders of the cereal crops, the nuts or the like are provided in the completely cooked state so that a user can eat instantly without a separate heating process.

Further, according to the present invention, since the system sterilization manner in which the sterilization condition is maintained over the entire processes including the steaming unit, cooking unit and sealing unit by using the saturated steam having the high pressure and high temperature, it is possible to completely eliminate even the thermo-resistant bacteria contained in the contents filled in the opened container. Also the introduction of the external air is fundamentally prevented and the bacteria contained in the air are prevented from being contacted with the contents, and thus it is possible to preserve the packaged completely cooked rice for a long time.

While the present invention has been described with respect to the specific embodiments, it will be apparent to those skilled in the art that various changes and modifications may be made without departing from the spirit and scope of the invention as defined in the following claims.

The invention claimed is:

1. An apparatus for manufacturing completely cooked rice or completely cooked mixed rice, comprising:
   multiple processing units disposed in one chamber,
   the multiple processing units comprising:
   a steaming unit which is configured to supply a first steam having first pressure and first temperature to an opened container in order to sterilize and primarily cook rice in the opened container, the rice having been washed and soaked in water and dried to have a water content of less than 20%, wherein the steaming unit includes a first high pressure steam controlling part configured to maintain an inner steam pressure of the steaming unit by the first steam to 1.2~3.0 kgf/cm$^2$, and wherein the steaming unit is further configured for the opened container to stay in the steaming unit for 2~5 minutes under the inner steam pressure of 1.2~3.0 kgf/cm$^2$;
   a first pressure damping unit;
   a cooking unit which is configured to supply a second steam having a second pressure and a second temperature to the sterilized and primarily cooked rice in the opened container transferred from the steaming unit via the first pressure damping unit in order to additionally sterilize and then completely cook the sterilized and primarily cooked rice in the opened container, wherein the cooking unit comprises a water shower system in which multiple nozzles are arranged and which is configured to supply a desired amount of water to the sterilized and primarily cooked rice in the opened container, wherein the cooking unit includes a second high pressure steam controlling part configured to maintain an inner steam pressure of the cooking unit by the second steam to 0.5~2.0 kgf/cm$^2$, and wherein the cooking unit is further configured for the opened container to stay in the cooking unit for 15~40 minutes under the inner stem pressure of 0.5~2.0 kgf/cm$^2$;
   a second pressure damping unit; and
   a sealing unit which is configured to supply clean nitrogen gas to the completely cooked rice and in which an upper end of the opened container is sealed with a lid film,
   wherein the steaming unit, the first pressure damping unit, the cooking unit, the second pressure damping unit and the sealing unit are connected in series in the described order in the one chamber so that the opened container can be input into and output from each of the units.

2. The apparatus according to claim 1, wherein the cooking unit further comprises an extra insert system which additionally supplies a solid matter or the solid matter mixed with a liquid matter to the rice in the opened container transferred from the steaming unit, the solid matter comprising various spices, seafood, or edible ingredients.

* * * * *